(12) United States Patent
Otsuka et al.

(10) Patent No.: US 7,341,320 B2
(45) Date of Patent: Mar. 11, 2008

(54) ELECTROMAGNETICALLY ACTUATED VALVE

(75) Inventors: Yukinori Otsuka, Kanagawa (JP);
Hiromasa Kojima, Kanagawa (JP);
Tatsuya Takamori, Hokkaido (JP);
Akimichi Shimazu, Kanagawa (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/832,333

(22) Filed: Apr. 27, 2004

(65) Prior Publication Data

US 2004/0232763 A1  Nov. 25, 2004

(30) Foreign Application Priority Data

May 19, 2003   (JP)   ............... 2003-139982

(51) Int. Cl.
*B60T 8/36*   (2006.01)

(52) U.S. Cl. .................................. 303/119.2

(58) Field of Classification Search ............. 303/119.2, 303/119.3, DIG. 10; 251/129.03, 129.15
See application file for complete search history.

(56) References Cited

U.S. PATENT DOCUMENTS

| | | | |
|---|---|---|---|
| 5,603,483 A | 2/1997 | Reuter et al. | |
| 5,879,060 A | 3/1999 | Megerle et al. | |
| 6,084,493 A | 7/2000 | Siegel | |
| 6,092,781 A | 7/2000 | Hohl et al. | |
| 6,189,985 B1 | 2/2001 | Fritsch et al. | |
| 6,254,199 B1 * | 7/2001 | Megerle et al. | 303/119.2 |
| 6,254,200 B1 * | 7/2001 | Ganzel | 303/119.2 |
| 6,268,784 B1 | 7/2001 | Feigel et al. | |
| 6,273,528 B1 | 8/2001 | Scheibel | |
| 6,318,703 B1 | 11/2001 | Goossens et al. | |
| 6,332,655 B1 | 12/2001 | Kamiya et al. | |
| 6,382,250 B1 | 5/2002 | Gruschwitz et al. | |
| 6,427,972 B1 * | 8/2002 | Kirschner | 251/129.15 |
| 6,439,265 B1 | 8/2002 | Gruschwitz et al. | |
| 6,450,590 B1 | 9/2002 | Leventhal | |
| 6,627,077 B2 | 9/2003 | Fritsch et al. | |
| 6,637,724 B1 * | 10/2003 | Mayer | 251/129.15 |
| 6,644,621 B2 | 11/2003 | Ji et al. | |
| 6,644,623 B1 * | 11/2003 | Voss et al. | 251/129.15 |
| 6,719,267 B2 | 4/2004 | Torii et al. | |
| 6,755,390 B2 * | 6/2004 | Masuda et al. | 251/30.03 |
| 6,840,499 B2 | 1/2005 | Ahn | |
| 6,846,408 B2 * | 1/2005 | Knight | 210/171 |
| 2003/0183790 A1 | 10/2003 | Ji et al. | |
| 2003/0201418 A1 | 10/2003 | Ahn | |
| 2004/0011981 A1 | 1/2004 | Ahn | |

FOREIGN PATENT DOCUMENTS

| | | |
|---|---|---|
| DE | 43 32 820 A1 | 3/1995 |
| DE | 43 36 860 A1 | 5/1995 |

(Continued)

*Primary Examiner*—Bradley King
(74) *Attorney, Agent, or Firm*—Foley & Lardner LLP

(57) ABSTRACT

An electromagnetically actuated valve including a housing having a fluid path and a valve retaining bore located in course of the fluid path, a tubular valve casing mounted to the valve retaining bore, a valve body electromagnetically operative to axially move within the tubular valve casing and allow and prevent a flow of fluid passing through the fluid path of the housing, and a filter disposed at an axial end of the tubular valve casing. The filter includes a fluid passage communicated with the fluid path of the housing.

15 Claims, 4 Drawing Sheets

FOREIGN PATENT DOCUMENTS

| | | |
|---|---|---|
| DE | 44 03 295 A1 | 8/1995 |
| DE | 195 47 374 A1 | 6/1997 |
| DE | 196 04 317 A1 | 8/1997 |
| DE | 196 35 693 A1 | 3/1998 |
| DE | 197 00 979 A1 | 7/1998 |
| DE | 197 00 980 A1 | 7/1998 |
| DE | 197 10 353 A1 | 9/1998 |
| DE | 197 39 886 A1 | 3/1999 |
| DE | 198 39 224 A1 | 3/1999 |
| DE | 198 43 762 A1 | 3/2000 |
| DE | 199 56 821 A1 | 5/2000 |
| DE | 199 10 207 A1 | 9/2000 |
| DE | 199 21 875 A1 | 11/2000 |
| DE | 199 49 222 A1 | 4/2001 |
| DE | 199 51 665 A1 | 5/2001 |
| DE | 199 55 884 A1 | 5/2001 |
| DE | 199 55 886 A1 | 5/2001 |
| DE | 199 55 888 A1 | 5/2001 |
| DE | 100 02 269 A1 | 7/2001 |
| DE | 100 46 046 A1 | 8/2001 |
| DE | 100 40 740 A1 | 9/2001 |
| DE | 100 60 223 A1 | 2/2002 |
| DE | 100 64 169 A1 | 2/2002 |
| DE | 101 03 284 A1 | 8/2002 |
| DE | 101 61 130 A1 | 7/2003 |
| EP | 1 065 116 A2 | 1/2001 |
| EP | 1 228 935 A2 | 8/2002 |
| JP | 11-166659 A | 6/1999 |
| JP | 2000-512585 A | 9/2000 |
| WO | WO 97/28999 A1 | 8/1997 |

* cited by examiner

US 7,341,320 B2

ELECTROMAGNETICALLY ACTUATED VALVE

BACKGROUND OF THE INVENTION

The present invention relates to an electromagnetically actuated valve useable in an anti-lock brake system for controlling brake fluid pressure in a vehicle.

Japanese Translation of PCT International Application No. 2000-512585 (corresponding to U.S. Pat. No. 6,092,781) discloses an electromagnetically actuated valve for hydraulic brake systems for motor vehicles. The electromagnetically actuated valve of this related art is a so-called normally open type pressure intensifying valve having the following structure. A housing has a pressure fluid path and a valve retaining bore in course of the pressure fluid path. The pressure fluid path has one end connected to a master cylinder and the other end connected to a wheel cylinder. A tubular valve casing made of metal is disposed within the valve retaining bore and has a radial passage radially extending through a circumferential wall thereof and communicated with the pressure fluid path. A valve seat is fixed into the valve casing and has an axial fluid passage communicated with the radial passage of the valve casing. A valve body is disposed within the valve casing and electromagnetically actuated to axially move and shift between an open position and a closed position. In the open position, the valve body is disengaged from the valve seat to allow fluid communication between the axial fluid passage of the valve seat and the radial passage of the valve casing, and in the closed position, the valve body is engaged with the valve seat to block the fluid communication therebetween.

Specifically, a cylinder is fixed to an upper end portion of the valve casing which acts as a stationary core. A plunger is slidably accommodated in the cylinder. A magnetic coil is disposed around the upper end portion of the valve casing. When the magnetic coil is de-energized, the valve body is kept in the open position to thereby allow the fluid communication between the axial fluid passage of the valve seat and the radial passage of the valve casing. When the magnetic coil is energized, the plunger is moved to urge the valve body to the closed position to thereby block the fluid communication between the axial fluid passage of the valve seat and the radial passage of the valve casing. Thus, a flow of the brake fluid flowing between the master cylinder and the wheel cylinder via the fluid path is controlled.

SUMMARY OF THE INVENTION

In the anti-block brake system, it is demanded to downsize the housing for accommodating a large number of pressure intensifying valves and pressure reducing valves in order to improve installation thereof in an engine room of vehicles and reduction of weight thereof. Therefore, there has been proposed an electromagnetically actuated valve for the anti-block brake system which employs the valve casing having a sufficiently decreased outer diameter, for instance, a few millimeters. Such the valve casing must be produced with high accuracy.

In the above-described related art, the radial passage of the valve casing of the electromagnetically actuated valve may be formed by drilling. The drilling work is conducted with difficulties, with the result that production efficiency of the electromagnetically actuated valve will be deteriorated and the production cost will be increased.

Further, if a fluid passage is formed on an axial end face of the valve casing so as to be communicated with the pressure fluid path of the housing, instead of forming the radial passage in the circumferential wall of the valve casing, the following disadvantage will be caused. Generally, a seal is arranged on the axial end face of the valve casing for the purpose of preventing leakage of the brake fluid from the valve. In such a case, if there occurs deformation in the seal, the deformed seal will block the fluid passage formed on the axial end face of the valve casing. For this reason, it is difficult to simply provide the fluid passage on the axial end face of the valve casing for the fluid communication with the pressure fluid path of the housing.

It is an object of the present invention to provide an electromagnetically actuated valve in which a fluid passage communicated with a fluid path formed in a housing is provided in not a tubular valve casing but a filter, whereby formation efficiency of the fluid passage and production efficiency of the electromagnetically actuated valve as a whole can be improved and the production cost can be reduced.

The other objects and features of this invention will become understood from the following description with reference to the accompanying drawings.

In one aspect of the present invention, there is provided an electromagnetically actuated valve, comprising:
  a housing including a fluid path and a valve retaining bore in course of the fluid path;
  a tubular valve casing mounted to the valve retaining bore;
  a valve body electromagnetically operative to axially move within the tubular valve casing and allow and prevent a flow of fluid passing through the fluid path of the housing; and
  a filter disposed at an axial end of the tubular valve casing, the filter including a fluid passage communicated with the fluid path of the housing.

In a further aspect of the present invention, there is provided an electromagnetically actuated valve, comprising:
  a housing including a fluid path and a valve retaining bore in course of the fluid path;
  a tubular valve casing mounted to the valve retaining bore;
  a valve body electromagnetically operative to axially move within the tubular valve casing and allow and prevent a flow of fluid passing through the fluid path of the housing; and
  a filter disposed at an axial end of the tubular valve casing, the filter including a fluid passage communicated with the fluid path of the housing;
  wherein the filter comprises a cylindrical base wall, and the fluid passage of the filter comprises a radial passage radially extending through the base wall and a communication passage circumferentially extending and connected with the radial passage.

DETAILED DESCRIPTION OF THE INVENTION

Figure 1:
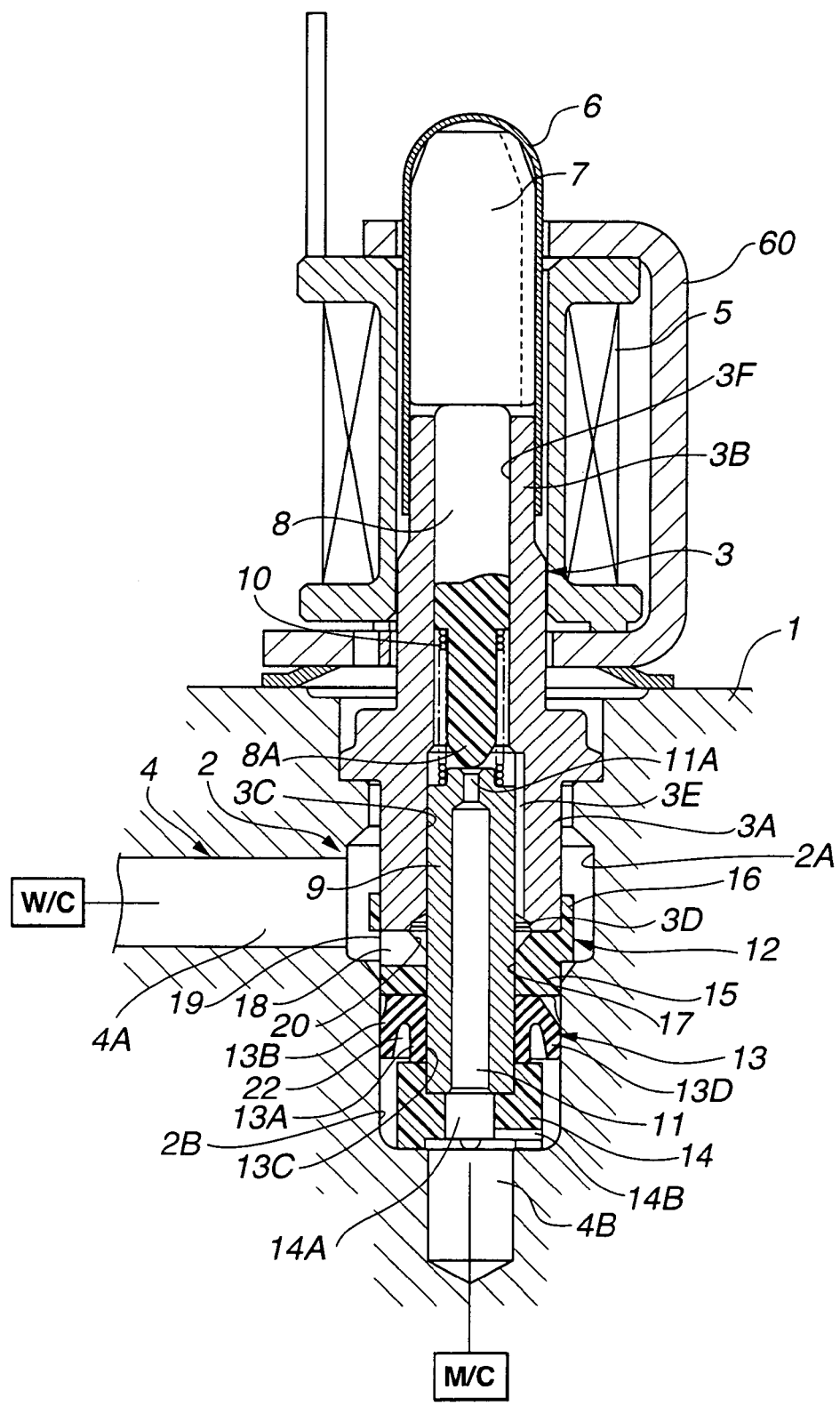
FIG. 1 is a longitudinal cross-section of an electromagnetically actuated valve according to a first embodiment of the present invention.

Referring to FIGS. 1 to 4, an electromagnetically actuated valve according to a first embodiment of the present invention now is explained. In this embodiment, the electromagnetically actuated valve is applied to an anti-lock brake system for a vehicle, and is of a normally open type. As illustrated in FIG. 1, the electromagnetically actuated valve includes housing 1 having a wall that defines fluid path 4 and valve retaining bore 2. Valve retaining bore 2 is located in course of fluid path 4. Valve retaining bore 2 is so configured as to receive tubular valve casing 3 as explained later. Fluid path 4 is communicated with larger-diameter portion 2A of valve retaining bore 2 through one communication portion 4A and connected to wheel cylinder W/C of the anti-lock brake system. Fluid path 4 is also communicated with smaller-diameter portion 2B of valve retaining bore 2 through another communication portion 4B and connected to master cylinder M/C of the anti-lock brake system. Specifically, communication portion 4A of fluid path 4 is opposed to a circumferential periphery of larger-diameter portion 2A of valve retaining bore 2. Communication portion 4B of fluid path 4 is opposed to a bottom, namely, an axial end, of smaller-diameter portion 2B of valve retaining bore 2.

Tubular valve casing 3 is mounted into valve retaining bore 2. Valve casing 3 includes one axial end portion 3A partially received in large-diameter portion 2A of valve retaining bore 2 and opposite axial end portion 3B projecting from valve retaining bore 2 to the outside of housing 1. One axial end portion 3A has an outer diameter larger than that of opposite axial end portion 3B, and larger-diameter valve bore 3C larger in diameter than smaller-diameter valve bore 3F of opposite axial end portion 3B. Larger-diameter valve bore 3C and smaller-diameter valve bore 3F are communicated with each other. Magnetic coil 5 having a generally cylindrical shape is mounted onto opposite axial end portion 3B of valve casing 3 acting as a stationary core. Magnetic coil 5 has a central bore into which metal cylinder 6 having an closed end is fixed. A circumferential wall of metal cylinder 6 is partially disposed between magnetic coil 5 and opposite axial end portion 3B of valve casing 3. Metal plunger 7 acting as a moveable core is axially moveably disposed inside metal cylinder 6. Yoke 60 is disposed around an outer periphery of magnetic coil 5.

Shaft-shaped valve body 8 made of a suitable synthetic resin material is coaxially arranged at one end of plunger 7 in contact therewith. Valve body 8 is substantially disposed within valve bore 3F of opposite axial end portion 3B of valve casing 3 and partially projects into valve bore 3C of one axial end portion 3A thereof. Valve body 8 is electromagnetically operated to axially move within valve bores 3F and 3C and allow and prevent a flow of fluid passing through fluid path 4 in response to switching between de-energization of magnetic core 5 and energization thereof. Specifically, valve body 8 has closure portion 8A at a tip end thereof which is integrally formed therewith. Valve body 8 has an open position as shown in FIG. 1, where closure portion 8A is out of contact with valve seat 9 to allow the flow of fluid passing through fluid path 4, and a closed position where closure portion 8A is in contact with valve seat 9 to block the flow of fluid passing through fluid path 4. Valve body 8 is always urged toward the open position by valve spring 10 that is installed between a step portion of valve body 8 and an axial end portion of valve seat 9. Valve body 8 is moved between the open position and the closed position upon switching between de-energization of magnetic core 5 and energization thereof.

Valve seat 9 having a generally cylindrical shape is fixed into valve bore 3C of one axial end portion 3A of valve casing 3 by press-fitting. Valve seat 9 includes axial fluid passage 11 and smaller-diameter hole 11A communicated with axial fluid passage 11. Smaller-diameter hole 11A is open to one axial end face of valve seat 9 which acts as a seat surface coming into contact with closure portion 8A of valve body 8 when valve body 8A is moved to the closed position. Axial fluid passage 11 is communicated with communication portion 4A of fluid path 4 via smaller-diameter hole 11A, circumferential groove 3D and axial groove 3E of valve casing 3, and fluid passages 18 and 20 of filter 12. Specifically, circumferential groove 3D is formed on an end surface of one axial end portion 3A of valve casing 3 and has a generally annular shape, specifically, a generally truncated cone shape. Axial groove 3E axially extends on an inner peripheral surface of one axial end portion 3A of valve casing 3 which surrounds valve bore 3C. Axial groove 3E is communicated with smaller-diameter hole 11A of axial fluid passage 11 and connected with circumferential groove 3D. Circumferential groove 3D is communicated with fluid passages 18 and 20 of filter 12. Filter 12 is arranged at a distal end of one axial end portion 3A of valve casing 3 and mounted to a projecting portion of valve seat 9 which projects from valve bore 3C of one axial end portion 3A. Filter 12 extends over larger-diameter portion 2A and smaller-diameter portion 2B of valve retaining bore 2.

Axial fluid passage 11 of valve seat 9 is open to an opposite axial end face thereof and communicated with fluid path 4 via communication portion 4B and axial passage 14A of filter 14. Filter 14 is mounted to a tip end of the projecting portion of valve seat 9 and disposed within smaller-diameter portion 2B of valve retaining bore 2 in contact with the bottom thereof. Filter 14 has radial passage 14B communicating axial passage 14A and smaller-diameter portion 2B of valve retaining bore 2. Filter 14 is configured to generate a radial gap between an outer circumferential surface thereof and the surface of the wall of housing 1 which is opposed to the outer circumferential surface of filter 14. Filters 12 and 14 are constructed to filter a brake fluid flowing between wheel cylinder W/C and master cylinder M/C. Seal 13 made of a rubber material is axially disposed between filters 12 and 14 and mounted to the projecting portion of valve seat 9. Filter 12, seal 13 and filter 14 are in axial alignment with valve casing 3.

Figure 2:
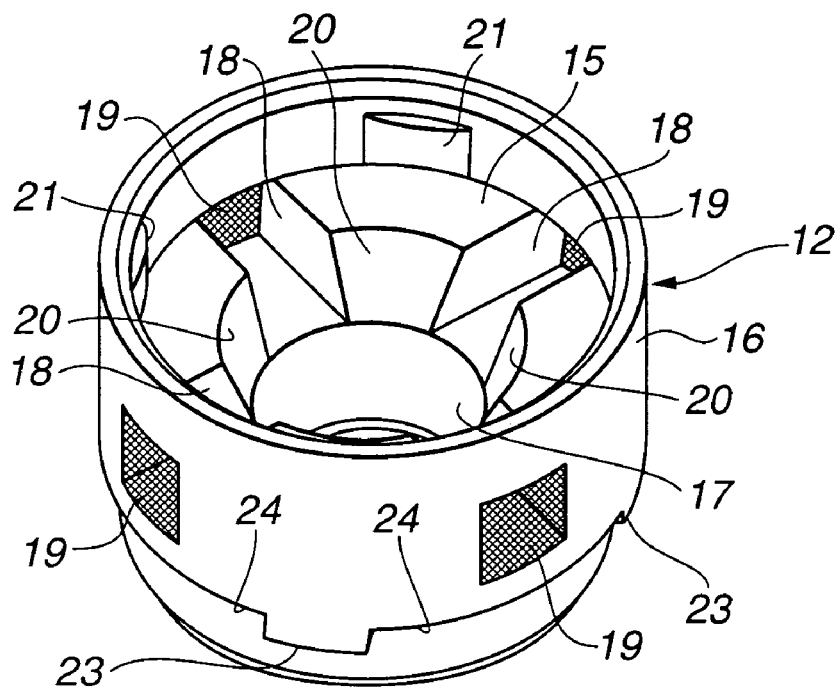
FIG. 2 is a perspective view of a filter used in the first embodiment.
Figure 3:
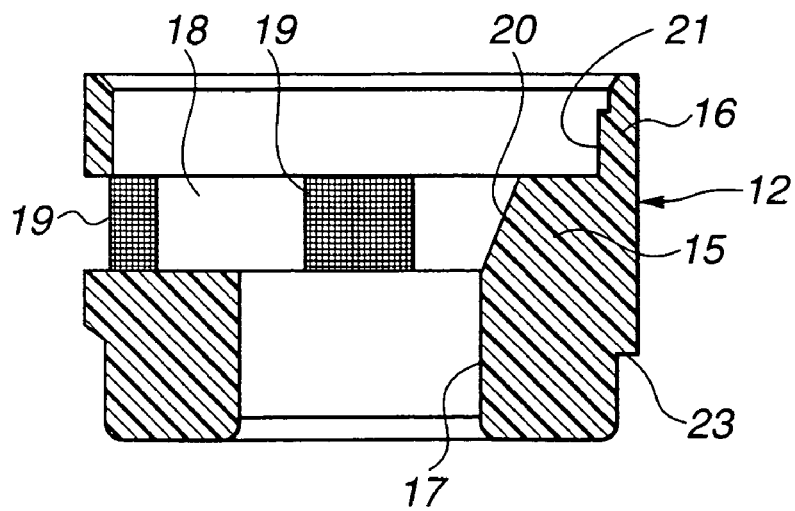
FIG. 3 is a cross-section of the filter shown in FIG. 2, taken along an axis thereof.
Figure 4:
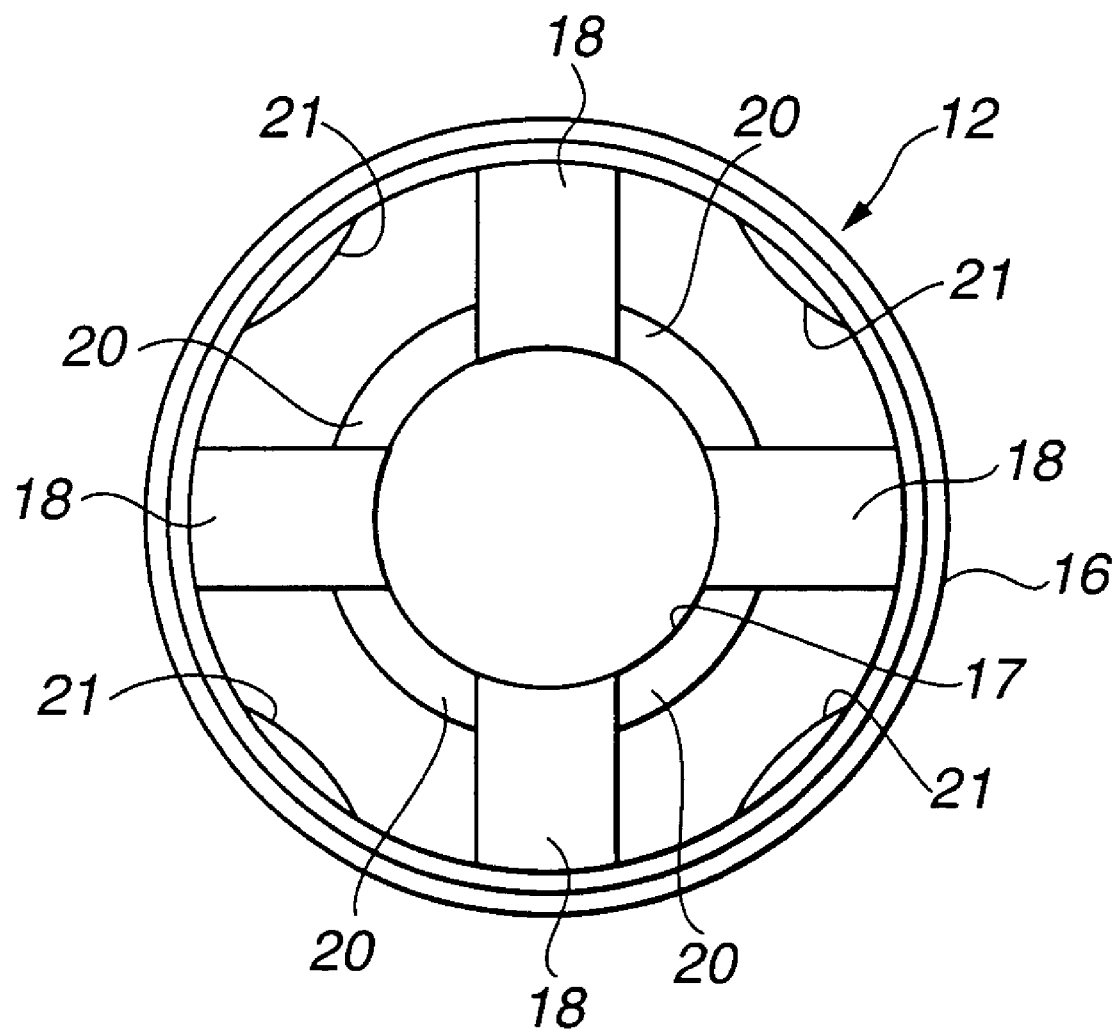
FIG. 4 is a plan view of the filter shown in FIG. 2.

Specifically, as illustrated in FIGS. 2-4, filter 12 has a generally cup-shape. Filter 12 is made of a suitable synthetic resin and includes cylindrical base wall 15 and cylindrical fitting wall 16 axially extending from an outer circumferential periphery of an axial end surface of base wall 15. Base wall 15 includes a larger-diameter wall portion with fitting wall 16 and a smaller-diameter wall portion received in smaller-diameter portion 2B of valve retaining bore 2 as shown in FIG. 1. Base wall 15 has insertion hole 17 axially extending through central portions of the larger-diameter and smaller-diameter wall portions. The projecting portion of valve seat 9 is inserted into insertion hole 17 to thereby mount filter 12 thereonto. Fitting wall 16 has a reduced thickness less than a thickness of base wall 15 and is fitted onto an outer circumferential surface of the distal end portion of one axial end portion 3A of valve casing 3 as shown in FIG. 1.

Base wall 15 has four radial fluid passages 18 radially extending through the larger-diameter wall portion thereof.

Radial fluid passages 18 are in the form of radial grooves formed on the axial end surface of base wall 15 which is in contact with the end surface of one axial end portion 3A of valve casing 3. Radial fluid passages 18 are positioned around insertion hole 17 so as to make substantially a right angle between the adjacent radial fluid passages 18 and form a generally cross shape as shown in FIG. 4. Each of radial fluid passages 18 has an outer end open to an outer circumferential surface of the larger-diameter wall portion of base wall 15. Rectangular filter mesh 19 is disposed at the outer end of radial fluid passage 18. At least one of radial fluid passages 18 is communicated with communication portion 4A of fluid path 4 via filter mesh 19.

Base wall 15 further has communication passages 20 formed on the larger-diameter wall portion thereof. Communication passages 20 circumferentially extend along an inner circumferential periphery of the axial end surface of base wall 15 which surrounds insertion hole 17. Communication passages 20 are disposed between radial fluid passages 18 and connected therewith. Communication passages 20 are disposed axially opposed to circumferential groove 3D of one axial end portion 3A of valve casing 3 and communicated with circumferential groove 3D. Each of communication passages 20 is in the form of a groove. Communication passages 20 form a part of a reversed truncated-cone shape. Communication passages 20 have a uniform axial length and a radial length decreasing toward an opposite axial end of base wall 15 as shown in FIG. 1. Each of communication passages 20 is defined by a generally sector-shaped surface tapered toward the opposite axial end of base wall 15 as shown in FIG. 2.

Base wall 15 further includes axial projections 23 axially extending from the larger-diameter wall portion on an opposite side of fitting wall 16. Axial projections 23 are arranged in circumferentially spaced relation to thereby define axially recessed portions 24 between axial projections 23. Tip ends of axial projections 23 are supported on a step of the wall of housing 1 which is disposed between larger-diameter portion 2A and smaller-diameter portion 2B of valve retaining bore 2. Axially recessed portions 24 cooperate with the step of the wall of housing 1 to define clearances therebetween.

Fitting wall 16 includes inward projection 21 formed integrally therewith and radially inwardly extending from an inner circumferential surface thereof. Inward projection 21 is pressed onto the outer circumferential surface of the distal end portion of one axial end portion 3A of valve casing 3. Filter 12 is firmly held on one axial end portion 3A of valve casing 3 by inward projection 21.

Referring back to FIG. 1, seal 13 is explained in detail. In this embodiment, seal 13 is in the form of a cup seal. Seal 13 is configured to allow a part of the brake fluid flowing in one direction, namely, flowing from wheel cylinder W/C toward master cylinder M/C, to bypass filter 12 and prevent a part of the brake fluid flowing in an opposite direction, namely, flowing from master cylinder M/C toward wheel cylinder W/C, from bypassing filter 12. Specifically, seal 13 has insertion hole 13C at a central portion thereof. The projecting portion of valve seat 9 is inserted into insertion hole 13C to thereby mount seal 13 thereonto. Seal 13 has a double-seal structure disposed radially outside insertion hole 13C, which includes radial-inner seal portion 13A and radial-outer seal portion 13B.

Radial-inner and outer seal portions 13A and 13B are joined with each other at axial ends thereof which are located on a side of filter 12. Annular pressure-receiving portion 22 is defined between radial-inner and outer seal portions 13A and 13B. Radial-inner seal portion 13A is in intimate contact with an outer circumferential surface of the projecting portion of valve seat 9. In contrast, radial-outer seal portion 13B is radially moveable between a seal position and a non-seal position depending on a fluid pressure applied to pressure-receiving portion 22. In the seal position, tip end portion 13D of radial-outer seal portion 13B is urged onto a surface of the wall of housing 1 which is opposed to an outer circumferential surface of tip end portion 13D, due to the fluid pressure applied to pressure-receiving portion 22. Thus, the part of the brake fluid flowing from master cylinder M/C into pressure-receiving portion 22 via communication portion 4B of fluid path 4 is prevented from passing by the outer circumferential surface of tip end portion 13D and bypassing filter 12.

In the non-seal position, tip end portion 13D of radial-outer seal portion 13B is disengaged from the surface of the wall of housing 1 which is opposed to the outer circumferential surface of tip end portion 13D. There is generated a clearance between the outer circumferential surface of tip end portion 13D and the opposed surface of the wall of housing 1. In this state, the part of the brake fluid flowing from wheel cylinder W/C is permitted to bypass filter 12 and pass through the clearance between the mutually opposed surfaces of the wall of housing 1 and tip end portion 13D of radial-outer seal portion 13B of seal 13. The part of the brake fluid then flows into communication portion 4B of fluid path 4 via the radial gap between filter 14 and the surface of the wall of housing 1, and passages 14B and 14A of filter 14.

When a normal braking operation is conducted by a vehicle driver, a brake fluid is delivered from master cylinder M/C into fluid path 4. The brake fluid flows from communication portion 4B of fluid path 4 into axial fluid passage 11 of valve seat 9 via axial passage 14A of filter 14. The brake fluid passes through axial fluid passage 11 and flows into filter 12 via axial groove 3E and circumferential groove 3D of valve casing 3. The brake fluid then passes through communication passage 20 and radial fluid passage 18 of filter 12 and flows into fluid path 4 through communication portion 4A and toward wheel cylinder W/C. When the brake fluid flows into axial fluid passage 11 through communication portion 4B of fluid path 4, a part of the brake fluid is separated from the flow flowing into axial fluid passage 11 and flows into pressure receiving portion 22 of seal 13 via passages 14A and 14B of filter 14 and the radial gap between filter 14 and the surface of the wall of housing 1. This causes tip end portion 13D of radial-outer seal portion 13B of seal 13 to be radially outwardly moved to the seal position. Thus, seal 13 prevents the part of the brake fluid flowing from master cylinder M/C from bypassing filter 12 and entering into communication portion 4A of fluid path 4. As a result, an efficient braking performance can be obtained.

On the other hand, when the braking operation is stopped, the brake fluid is discharged from wheel cylinder W/C into fluid path 4. The brake fluid flows into larger-diameter portion 2A of valve retaining bore 2 through communication portion 4A of fluid path 4 and then enters into radial fluid passage 18 and communication passage 20 of filter 12. The brake fluid passes through filter 12 and flows into axial fluid passage 11 of valve seat 9 via circumferential groove 3D and axial groove 3E of valve casing 3. The brake fluid passing through axial fluid passage 11 flows into fluid path 4 through communication portion 4B via axial passage 14A of filter 14. The brake fluid is then returned to master cylinder M/C. In this case, a part of the brake fluid flowing into larger-diameter portion 2A of valve retaining bore 2 bypasses filter 12 and flows into the circumferential periphery of smaller-diameter portion 2B of valve retaining bore 2. Specifically, the part of the brake fluid flowing from larger-diameter portion 2A of valve retaining bore 2 enters into the clearance between recessed portions 24 of filter 12 and the step of the wall of housing 1 and flows toward seal 13 along the surface of the wall of housing 1 which defines smaller-diameter portion 2B of valve retaining bore 2. The part of the brake fluid reaches radial-outer seal portion 13B of seal 13 and presses tip end portion 13D thereof to move radially inwardly to the non-seal position. The part of the brake fluid is permitted to flow into fluid path 4 through communication portion 4B via filter 14. The part of the brake fluid is then returned to master cylinder M/C. Thus, seal 13 allows the part of the brake fluid flowing from wheel cylinder M/C to bypass filter 12 and enter into communication portion 4B of fluid path 4. As a result, there is provided a sufficient amount of the brake fluid which is returned from wheel cylinder W/C to master cylinder M/C. This can serve for stabilizing the braking performance.

As explained above, the fluid passage communicated with fluid path 4 is constituted of radial fluid passage 18 and communication passage 20 which are formed in filter 12 made of a synthetic resin material. Radial fluid passage 18 can be formed by a molding process for filter 12. Accordingly, the drilling for forming the fluid passage in a radial direction of the valve casing as conducted in the conventional art, can be omitted. This serves for improving formation of radial passage 18 and production efficiency of the electromagnetically actuated valve as a whole, and thereby reducing the production cost.

Further, with the provision of inward projection 21 formed integrally with fitting wall 16 of filter 12, filter 12 can be firmly mounted to valve casing 3. Furthermore, inward projection 21 acts as a reinforcing rib, whereby the strength of filter 12 can be enhanced and the durability can be improved.

Figure 5:
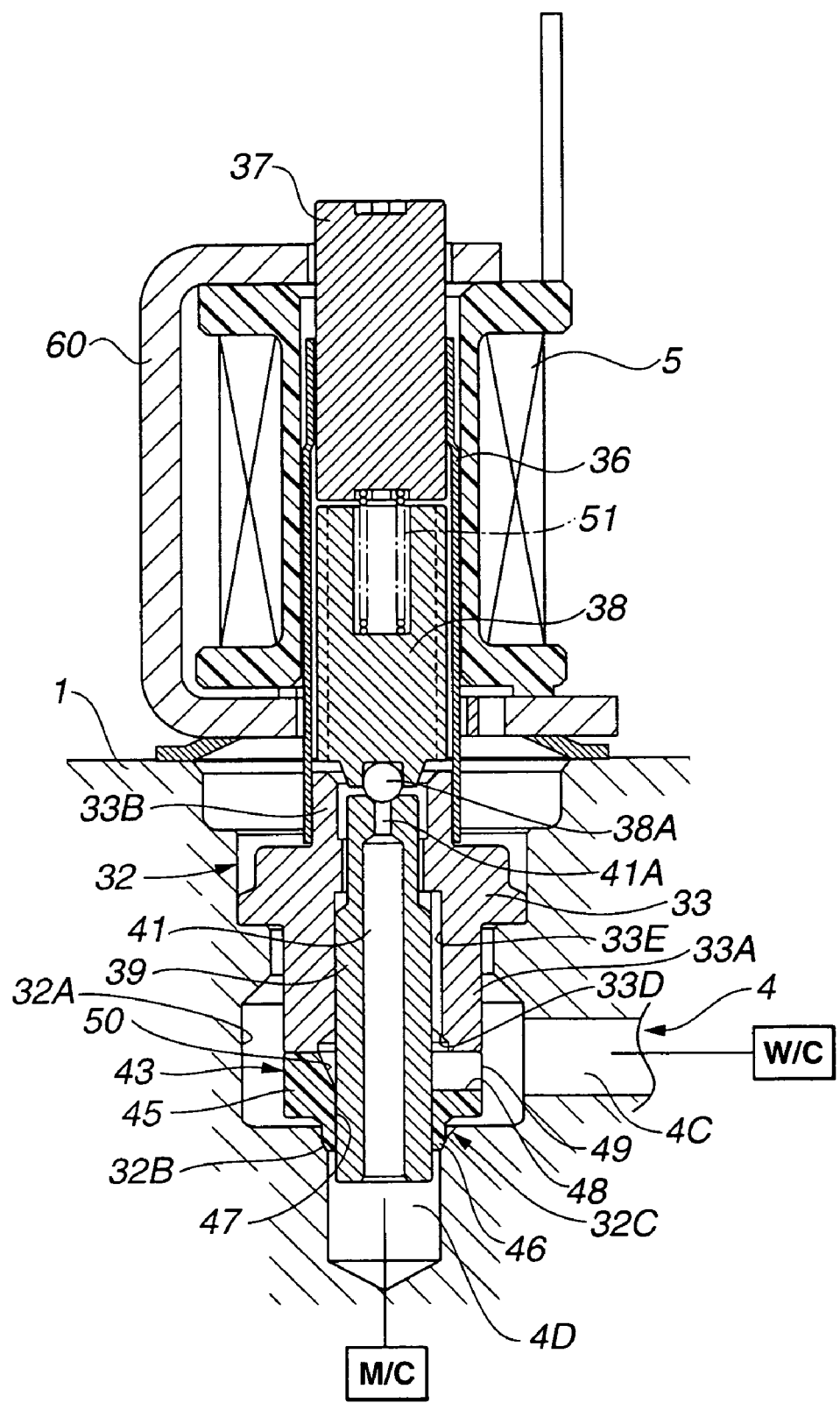
FIG. 5 is a longitudinal cross-section of an electromagnetically actuated valve according to a second embodiment of the present invention.

Referring to FIG. 5, a second embodiment of the electromagnetically actuated valve of the present invention will be explained hereinafter. In this embodiment, the electromagnetically actuated valve is applied to a pressure reducing valve of a normally closed type which is arranged near the normally open type pressure intensifying valve as described in the first embodiment. A basic structure of the electromagnetically actuated valve of the second embodiment is substantially the same as that of the electromagnetically actuated valve of the first embodiment. Housing 1 includes a wall defining fluid path 4 and valve retaining bore 32 located in course of fluid path 4. Fluid path 4 is communicated with larger-diameter portion 32A of valve retaining bore 32 through communication portion 4C and connected to wheel cylinder W/C. Fluid path 4 is also communicated with smaller-diameter portion 32C of valve retaining bore 32 through communication portion 4D and connected to master cylinder M/C.

Tubular valve casing 33 having a relatively small axial-length is mounted into valve retaining bore 32 such that valve casing 33 is entirely accommodated therein. Valve casing 33 includes one axial end 33A disposed within larger-diameter portion 32A of valve retaining bore 32 and opposite axial end portion 33B extending toward an outside of housing 1. Hollow metal cylinder 36 is mounted onto opposite axial end portion 33B of valve casing 33 and extends into the central bore of magnetic coil 5. Cylindrical stationary core 37 is fixed into an axial end portion of hollow metal cylinder 36 which is disposed on an opposite side of valve casing 33. Metal plunger 38 acting as a moveable core is disposed axially adjacent to stationary core 37 and axially moveably inside metal cylinder 6.

Ball-shaped valve body 38A made of metal is fixed to a tip end of plunger 38. Valve body 38A has a closed position as shown in FIG. 5, where valve body 38A is in contact with valve seat 39 to block a flow of fluid passing through fluid path 4, and an open position where valve body 38A is out of contact with valve seat 39 to allow the flow of fluid passing through fluid path 4. Valve body 38A is always urged toward the closed position by valve spring 51 that is installed between a spring chamber of valve body 38A and an axial end face of stationary core 37. Valve body 38A is electromagnetically operated to move between the closed position and the open position in response to switching between de-energization of magnetic core 5 and energization thereof.

Valve seat 39 having a generally cylindrical shape is fixed into a valve bore extending through valve casing 33 by press-fitting. Valve seat 39 includes axial fluid passage 41 and smaller-diameter hole 41A communicated with axial fluid passage 41. Smaller-diameter hole 41A is open to one axial end face of valve seat 39 which acts as a seat surface contacted with valve body 38A when valve body 38A is in the closed position. Axial fluid passage 41 is communicated with communication portion 4C of fluid path 4 via smaller-diameter hole 41A, circumferential groove 33D and axial groove 33E of valve casing 33, and fluid passages 48 and 50 of filter 43. Specifically, circumferential groove 33D is formed on an end surface of one axial end portion 33A of valve casing 33 and forms a part of a generally truncated cone. Axial groove 33E axially extends on an inner peripheral surface of one axial end portion 33A of valve casing 33 which surrounds the valve bore. Axial groove 33E is communicated with smaller-diameter hole 41A of axial fluid passage 41 and connected with circumferential groove 33D. Circumferential groove 33D is communicated with fluid passages 48 and 50 of filter 43.

Filter 43 is arranged at a distal end of one axial end portion 33A of valve casing 33 and mounted to a projecting portion of valve seat 39 which projects from the valve bore of valve casing 33. Filter 43 extends over larger-diameter portion 32A and smaller-diameter portion 32C of valve retaining bore 32. Filter 43 is made of a suitable synthetic resin and has a generally cup-shape. Filter 43 includes cylindrical base wall 45 and seal portion 46 that is formed integrally with base wall 45 and axially extends from a central part of an axial end surface of base wall 45. Insertion hole 47 axially extends through base wall 45 and seal portion 46. The projecting portion of valve seat 39 is inserted into insertion hole 47 to thereby mount filter 43 thereonto.

Base wall 45 has four radial fluid passages 48 radially extending in base wall 45. Radial fluid passages 48 are in the form of radial grooves formed on the axial end surface of base wall 45 which is in contact with the end surface of one axial end portion 33A of valve casing 33. Radial fluid passages 48 are positioned around insertion hole 17 so as to form a generally cross shape similar to radial fluid passages 18 of filter 12 of the first embodiment. Each of radial fluid passages 48 has an outer end open to an outer circumferential surface of base wall 45. At least one of radial fluid passages 48 is communicated with communication portion 4A of fluid path 4 via rectangular filter mesh 49.

Seal portion 46 includes a generally truncated cone-shaped part and has an outer circumferential surface pressed onto tapered surface 32B that is located at a periphery of a step portion between larger-diameter portion 32A and smaller-diameter portion 32C of valve retaining bore 32. Seal portion 46 prevents the brake fluid from flowing from master cylinder M/C toward wheel cylinder W/C and vice versa along an outer circumferential periphery of seal portion 46.

The second embodiment can perform substantially the same effects as those of the first embodiment. Further, since integral seal portion 46 is formed together with filter 43 upon molding, a separate cup seal can be omitted. This serves for reducing the number of parts of the electromagnetically actuated valve and increasing the production efficiency, resulting in saving the production cost.

The electromagnetically actuated valve of the present invention may be applied to various devices and actuators other than an anti-lock brake system. Further, filters 12 and 43 may be made of any suitable material other than synthetic resin.

This application is based on a prior Japanese Patent Application No. 2003-139982 filed on May 19, 2003. The entire contents of the Japanese Patent Application No. 2003-139982 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An electromagnetically actuated valve, comprising:
   a housing including a fluid path and a valve retaining bore;
   a tubular valve casing mounted to the valve retaining bore;
   a valve body electromagnetically operative to axially move within the tubular valve casing and allow and prevent a flow of fluid passing through the fluid path of the housing;
   a filter supported between an axial end of the tubular valve casing and a step portion of the housing, the filter including a fluid passage communicated with the fluid path of the housing; and
   a seal disposed on one axial end of the filter,
   wherein the seal is configured to: (a) allow a part of a flow of fluid flowing in one direction to bypass the filter; and (b) prevent a part of a flow of fluid flowing in an opposite direction from bypassing the filter,
   wherein the filter comprises a plurality of axial projections and at least one recessed portion between adjacent axial projections,
   wherein the part of the flow of fluid flowing in one direction to bypass the filter flows into a clearance that is defined between the recessed portion of the filter and the step portion of the housing,
   wherein the valve casing comprises an axial end portion,
   wherein the filter further comprises a cylindrical base wall and a fitting wall axially extending from an outer circumferential periphery of an axial end surface of the base wall, the fitting wall being fitted onto the axial end portion, and
   wherein the fitting wall of the filter comprises an inward projection radially inwardly extending from an inner circumferential surface thereof, the inward projection being pressed onto an outer circumferential surface of the axial end portion of the valve casing and holding the filter on the axial end portion of the valve casing.

2. The electromagnetically actuated valve as claimed in claim 1, further comprising a valve seat fixed into the tubular valve casing, the base wall having an axially extending insertion hole into which the valve seat is inserted to mount the filter thereonto.

3. The electromagnetically actuated valve as claimed in claim 1, wherein the fluid passage of the filter comprises a radial fluid passage radially extending in the base wall, and a communication passage circumferentially extending and connected with the radial fluid passage, the radial fluid passage and the communication passage being formed on the axial end surface of the base wall of the filter.

4. The electromagnetically actuated valve as claimed in claim 1, wherein the axial projections of the filter axially extend from an opposite side of the fitting wall.

5. The electromagnetically actuated valve as claimed in claim 1, wherein the axial end of the tubular valve casing and the step portion are configured to position the filter.

6. The electromagnetically actuated valve as claimed in claim 1, wherein the electromagnetically actuated valve is applied to an anti-lock brake system for a vehicle including a master cylinder and a wheel cylinder, the fluid path of the housing connecting the master cylinder and the wheel cylinder via the valve retaining bore.

7. The electromagnetically actuated valve as claimed in claim 6, wherein the seal is configured to: (a) allow a part of a flow of fluid flowing from the wheel cylinder toward the master cylinder to bypass the filter; and (b) prevent a part of a flow of fluid flowing form the master cylinder toward the wheel cylinder from bypassing the filter.

8. The electromagnetically actuated valve as claimed in claim 7, wherein the electromagnetically actuated valve is a normally open valve.

9. An electromagnetically actuated valve, comprising:
   a housing including a fluid path and a valve retaining bore;
   a tubular valve casing mounted to the valve retaining bore;
   a valve body electromagnetically operative to axially move within the tubular valve casing and allow and prevent a flow of fluid passing through the fluid path of the housing;
   a filter disposed at an axial end of the tubular valve casing, the filter including a fluid passage communicated with the fluid path of the housing; and
   a valve seat fixed into the tubular valve casing,
   wherein the filter comprises a cylindrical base wall and a fitting wall axially extending from an outer circumferential periphery of an axial end surface of the base wall, the base wall having an axially extending insertion hole into which the valve seat is inserted to mount the filter thereonto, the valve casing comprising an axial end portion onto which the fitting wall is fitted,
   wherein the fluid passage of the filter comprises a radial fluid passage radially extending in the base wall, and a communication passage circumferentially extending and connected with the radial fluid passage, the radial fluid passage and the communication passage being formed on the axial end surface of the base wall of the filter, and
   wherein the valve casing comprises a circumferential groove formed on an end surface of the axial end portion of the valve casing, and an axial groove connected with the circumferential groove, the circumferential groove being axially opposed to the communication passage of the filter and communicated therewith.

10. An electromagnetically actuated valve, comprising:
a housing including a fluid path and a valve retaining bore,
a tubular valve casing mounted to the valve retaining bore;
a valve body electromagnetically operative to axially move within the tubular valve casing and allow and prevent a flow of fluid passing through the fluid path of the housing;
a filter supported between an axial end of the tubular valve casing and a step portion of the housing, the filter including a fluid passage communicated with the fluid path of the housing; and
a seal disposed on one axial end of the filter, the seal being configured to allow a part of a flow of fluid flowing in one direction to bypass the filter and prevent a part of a flow of fluid flowing in an opposite direction from bypassing the filter,
wherein the valve casing comprises an axial end portion,
wherein the filter comprises a cylindrical base wall, and a fitting wall axially extending from an outer circumferential periphery of an axial end surface of the base wall, the fitting wall being fitted onto the axial end portion,
wherein the fluid passage of the filter comprises a radial passage radially extending through the base wall and a communication passage circumferentially extending and connected with the radial passage,
wherein the filter further comprises a plurality of axial projections and at least one recessed portion between adjacent axial projections, and
wherein the part of the flow of fluid flowing in one direction to bypass the filter flows into a clearance that is defined between the recessed portion of the filter and the step portion of the housing, and
wherein the fitting wall of the filter comprises an inward projection radially inwardly extending from an inner circumferential surface of the fitting wall, the inward projection being pressed onto an outer circumferential surface of the axial end portion of the valve casing and holding the filter on the axial end portion of the valve casing.

11. The electromagnetically actuated valve as claimed in claim 10,
wherein the axial projections of the filter axially extend from an opposite side of the fitting wall.

12. The electromagnetically actuated valve as claimed in claim 10, wherein the axial end of the tubular valve casing and the step portion are configured to position the filter.

13. The electromagnetically actuated valve as claimed in claim 10, wherein the electromagnetically actuated valve is applied to an anti-lock brake system for a vehicle including a master cylinder and a wheel cylinder, the fluid path of the housing connecting the master cylinder and the wheel cylinder via the valve retaining bore.

14. The electromagnetically actuated valve as claimed in claim 13, wherein the seal is configured to: (a) allow a part of a flow of fluid flowing from the wheel cylinder toward the master cylinder to bypass the filter; and (b) prevent a part of a flow of fluid flowing from the master cylinder toward the wheel cylinder from bypassing the filter.

15. The electromagnetically actuated valve as claimed in claim 14, wherein the electromagnetically actuated valve is a normally open valve.

* * * * *